United States Patent [19]

Trainor et al.

[11] Patent Number: 4,622,435

[45] Date of Patent: Nov. 11, 1986

[54] ADJUSTABLE LIGHT BASE AND TRANSFORMER HOUSING

[75] Inventors: Willis H. Trainor, Newark; Gary P. Weltlich, Pickerington, both of Ohio

[73] Assignee: ADB-Alnaco, Inc., Columbus, Ohio

[21] Appl. No.: 771,879

[22] Filed: Sep. 3, 1985

[51] Int. Cl.⁴ .............................................. H01F 27/02
[52] U.S. Cl. ...................................... 174/57; 361/332; 361/334; 220/3.7; 220/3.8
[58] Field of Search ........................ 336/65, 68, 90, 92; 361/331, 332, 334, 356, 377, 380, 392, 417, 419, 429; 220/3.7, 3.8, 327; 174/57; 362/362, 365, 368, 370, 372, 374, 267; 340/981, 983

[56] References Cited

U.S. PATENT DOCUMENTS

| 2,886,630 | 5/1959 | Gill | 174/57 |
| 3,390,224 | 6/1968 | Wyatt | 220/3.7 |
| 3,463,913 | 8/1969 | Shavalier | 362/372 |
| 4,343,033 | 8/1982 | Suzuki | 362/153 |
| 4,448,444 | 5/1984 | Toussaint | 361/331 |

Primary Examiner—G. P. Tolin
Attorney, Agent, or Firm—John L. Gray

[57] ABSTRACT

An adustable light base and transformer housing to house an isolation transformer and to be used as a mounting base for in pavement airport navigational lights comprising an adjustable upper portion adapted to receive said light fixture and maintain and position it at the proper elevation with respect to the surface of the airport runway.

4 Claims, 2 Drawing Figures

ADJUSTABLE LIGHT BASE AND TRANSFORMER HOUSING

BACKGROUND OF THE INVENTION

Existing light base and transformer housings which are used to house isolation transformers and also as mounting bases for in pavement airport navigational lights are usually in the form of cylindrical housings. The bottom end of such a cylindrical housing is closed and the cylinder wall is provided with openings for electrical conduit. The open end of the housing is provided with a flange which is open in its center and allows access to the inside of the cylindrical enclosure as well as provides a mounting surface that spacers, shims and ultimately a light fixture can be attached to. The flange has multiple bolt holes which permit the spacers, shims and light fixture to be threadedly fastened thereto. The existing process for installing such a light base and transformer housing involved placing the housing with the closed end down on compacted earth. A circular, protective plywood cover may be placed over the housing. Concrete or a bituminous surfacing material is then poured around the light base and transformer housing as part of the runway construction with the concrete or bituminous covering the top of the housing to a thickness of several inches. The surface material is then removed by cutting out a circular plug directly over the housing and slightly larger than the housing so that a light fixture can be mated and secured to the light base after the isolation transformer has been installed and connected to the wiring which either has been already installed in the conduit or placed there afterwards. Since the light fixture must be mounted to a specific height in relationship with the surface of the runway pavement, spacers and shims of various thickness must be placed on top of the light base between the light base and the light fixture to adjust the height accordingly. In order to do this, the installer must carefully measure the height of the runway above the top of the light base and order the appropriate shims and spacers for each individual housing before the installation can be completed. This results in considerable delay and is an extremely inefficient manner in which to provide the installation.

SUMMARY OF THE INVENTION

The invention of applicant provides an adjustable light base and transformer housing so that it is unnecessary to use shims or spacers, except in extreme situations and even in those cases standard size spacers can be used and can be inventoried by the installer.

It is therefore an object of this invention to provide an adjustable light base and transformer housing which may be adjusted in the field to the proper elevation to accommodate the navigational light to be attached thereto.

It is an additional object of this invention to provide such an adjustable light base and transformer housing which when adjusted to the proper elevation, may be fixedly positioned in that elevation even when exposed to the weight of a large aircraft passing thereover.

These together with other objectives and advantages of the invention should become apparent in the details of construction and operation, as more fully described herein and claimed, reference being had to the accompanying drawings forming a part hereof wherein like numerals refer to like parts throughout.

DETAILED DESCRIPTION OF THE INVENTION

Figure 1:
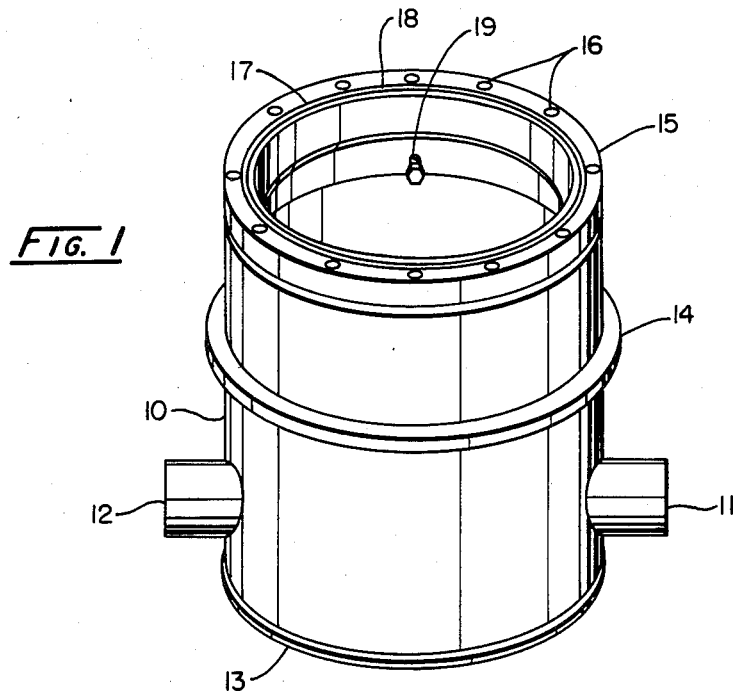
FIG. 1 is a perspective view of the adjustable light base and transformer housing of the instant invention.

Referring now more particularly to FIG. 1, the adjustable light base and transformer housing comprises a cylindrical member 10 provided with openings 11 and 12 which are adapted to receive electrical conduit. The bottom portion 13 of cylindrical member 10 is closed and a retaining ring 14, which helps maintain the cylindrical member 10 in a fixed position when concrete is poured around it, is also provided. The upper portion of the cylindrical member 10 has a hollow flange nut 15 positioned thereon provided with vertically extending threaded holes 16—16 which are parallel to the axis of said nut and extend therethrough. Groove 17 houses an O-ring 18 so that when the navigational light fixture is placed on top of the nut 15 and attached thereto by means of bolts which engage threaded holes 16—16, the interior of said cylindrical member 10 will be sealed to external weather conditions.

Figure 2:
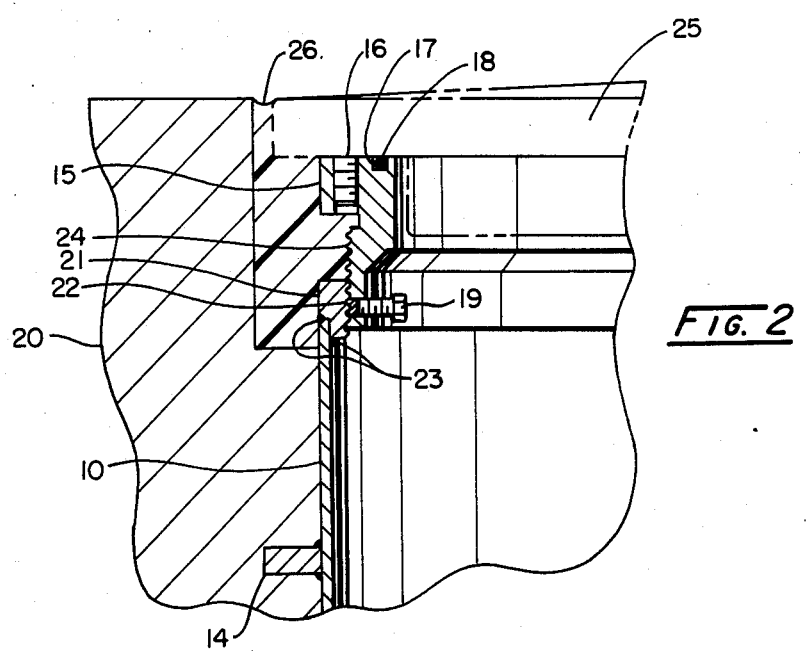
FIG. 2 is an enlarged sectional view of the upper portion of said adjustable light base and transformer housing.

Bolts 19—19 are disposed radially around the interior of the threaded portion of nut 15 and are of a length so as to engage the threaded portion of cylinder 10 as may be seen in FIG. 2. Preferably the bolts 19—19 are four in number.

Referring now more particularly to FIG. 2, the cylindrical member 10 is shown embedded in concrete runway 20 with retaining ring 14 held by the concrete 20 and thus positively positioning the adjustable light base and cylindrical member 10 so that it will not move. The upper portion of cylindrical member 10 is provided with a ring 21 which is provided with an internal threaded portion 22. Ring 21 may be secured to cylindrical member 10 by weldments 23. The hollow flange nut 15 is provided with a male threaded portion 24 which will engage the female threaded portion 22 of ring 21. The vertical threaded holes 16—16 are shown as is the groove 17 and O-ring 18.

In installing the adjustable light base and transformer housing, the cylinder 10 is placed on the compacted subsoil in the usual fashion and a protective plywood cover is placed over the top thereof. The hollow flange nut 15 may or may not be in place. This is also true of bolts 19—19. After the concrete 20 has been removed around the cylinder 10 to a depth as shown in FIG. 2, flange nut 15 may be rotated until the properly desired elevation has been achieved. When this has been accomplished bolts 19—19 may be tightened to engage the threaded portion 22 of ring 21 and this then fixedly positions flange nut 15 with respect to the airport runway elevation. A light fixture shown in outline at 25 may then be secured to the top of flange nut 15 by means of bolts which are inserted in threaded holes 16—16. Thereafter a suitable plastic sealant 26 may be inserted in the space between the concrete 20 and the upper portion of cylindrical member 10 and the flange nut 15 so as to completely seal cylindrical member 10 in place.

In some situations it may be necessary to use a spacer and in such cases, because of the adjustability of the flange nut 15, the flange nut 15 can be raised to a desired height so that the spacer will be of a thickness so that a uniform thickness of spacer can be used and it is not necessary to order spacers from a distant location.

While this invention has been described in its preferred embodiment, it is appreciated that slight variations may be made therefrom without departing from the true scope and spirit of the invention.

What is claimed is:

1. An adjustable light base and transformer housing comprising a cylindrical housing closed at one end and open at the opposite end, said cylindrical housing being provided with a plurality of openings adjacent said closed end adapted to receive an electrical conduit, said open end being provided with a female threaded portion around its internal circumference adjacent to said open end, a hollow flange nut provided with a male threaded portion around its external circumference and movably engaging and mating with said female threaded portion of the internal circumference of said cylindrical housing, said hollow flange nut being provided with a plurality of threaded holes extending through said hollow flange nut parallel to the axis of said hollow flange nut and equi-spaced thereon and adapted to receive bolts used in securing an inset light fixture to said flange nut, said hollow flange nut also being provided with a plurality of radially extending threaded holes extending through the male threaded portion of said hollow flange nut, a bolt threadedly engaging the threads of each of said radially extending threaded holes, with the head of each of said bolts positioned within the interior of said hollow flange nut, said bolts being of a length such that they can engage the female threaded portion of said cylindrical housing.

2. The adjustable light base and transformer housing of claim 1 wherein said hollow flange nut has an external diameter equal to the external diameter of said cylindrical housing in that portion of the hollow flange nut which is provided with a plurality of threaded holes parallel to the axis of said hollow flange nut.

3. The adjustable light base and transformer housing of claim 1 wherein said hollow flange nut is provided with a circumferentially extending groove adjacent to said plurality of threaded holes extending through said hollow flange nut and adjacent the inner circumference of said hollow flange nut and adapted to receive an O-ring.

4. The adjustable light base and transformer housing of claim 3 wherein said cylindrical housing is provided with a radially extending retainer ring around its circumference between its open end and said openings adjacent said closed end which are adapted to receive electrical conduit.

* * * * *